United States Patent [19]

Gjestrum et al.

[11] Patent Number: 4,756,268
[45] Date of Patent: Jul. 12, 1988

[54] ANGULAR MEMBER FOR SEISMIC CABLES TOWED BY A VESSEL

[75] Inventors: Einar Gjestrum, Bøverbu; Rolf Bjerkøy, Melsomvik, both of Norway; Clive Snook, Oegstgeest, Netherlands; Julius Bendiksen, Tertnes; Jan-Åge Langeland, Garnes, both of Norway

[73] Assignee: Geco A.S., Sandvika, Norway

[21] Appl. No.: 15,373

[22] Filed: Feb. 17, 1987

[30] Foreign Application Priority Data

Feb. 14, 1986 [NO] Norway ................... 860563

[51] Int. Cl.⁴ ............................................. B63B 21/00
[52] U.S. Cl. ...................................... 114/242; 114/253
[58] Field of Search ................. 114/242, 244, 253, 254

[56] References Cited

U.S. PATENT DOCUMENTS 2,944,507 7/1960 Beal ..................................... 114/253
3,568,623 3/1971 Gustavson ........................... 114/253
4,184,209 1/1980 Crist ..................................... 114/253

FOREIGN PATENT DOCUMENTS 372230 5/1932 United Kingdom ................ 114/253

Primary Examiner—Joseph F. Peters, Jr.
Assistant Examiner—Stephen P. Avila
Attorney, Agent, or Firm—Holman & Stern

[57] ABSTRACT

An angular member provided on seismic cables towed by a vessel and laterally displaced in parallel and in relation to the course of the vessel comprises a frame at least partly enclosing the cable in the area of angular deflection between an inner cable portion extending obliquely to the towing direction and the active main cable portion. The frame is formed of two frame plates secured in spaced relationship and having at the lead-in end for the cable a cable-fastening device and at the other end a pivotable ramp swingable in the plane of the frame plates. The ramp has a further fastening device for the cable. Another fastening device is pivotably connected to the frame plates for connecting thereto a wire to a paravane or the like. When towed in the water the angular member absorbs most of the forces normally exerted on the cable at the area of angular deflection.

10 Claims, 2 Drawing Sheets

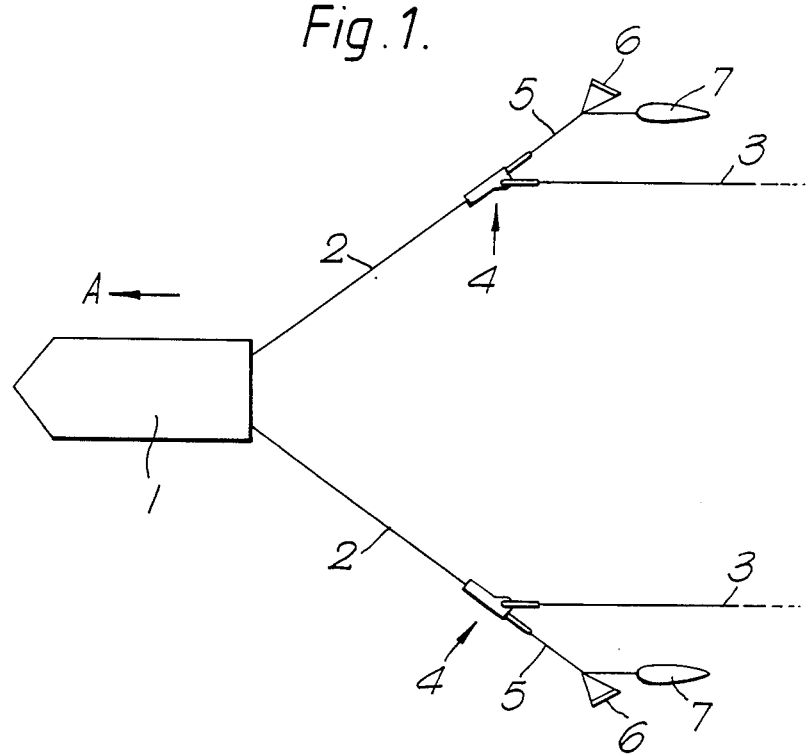
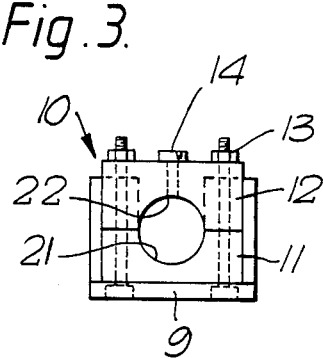

4,756,268

ANGULAR MEMBER FOR SEISMIC CABLES TOWED BY A VESSEL

BACKGROUND OF THE INVENTION

1. Field of the Invention

This invention relates to an angular member to be used for towing seismic cables, which are towed by a vessel in a position laterally displaced and in parallel relative to the course of travel of the vessel, with a frame member at least partly enclosing said cable in the area of angular deflection.

2. Description of the Prior Art

In seismic explorations at sea it may be desirable to provide a number of cables side-by-side in parallel behind the towing vessel, and this is especially done in connection with gun cables. Recently, explorations have also been made with several hydrophone cables or streamers side-by-side in parallel behind the towing vessel. For displacing the cables laterally, otter board devices and buoyancy means are conventionally used which are attached to a point on the cable. Thus, the inner portion of the cable will extend obliquely to the towing direction, and at the point where the buoyancy means and otter boards are secured, from which point cable extends in parallel with the towing direction, a very heavy load is produced. Not only is there a break or bending point in the cable, but yanking occurs due to the movement of the buoyancy means in the water, especially on the oblique inner portion. This can have a damaging effect on the attachment to the buoyancy means as well as on the cable itself that may break at this point. Furthermore, there is a special problem in connection with hydrophone cables or streamers which are provided with sensitive hydrophones and other electronic equipment which, indeed, can be disturbed by such yanking and wear and tear. Efforts have been made, previously, to eliminate these problems by providing a special towing cable running to said otter board/buoyancy means at the front edge of the main cable and by securing the latter to the towing cable at several points, but this system is very bothersome, especially when cables are hauled in or payed out, and above all, when there are a number of cables to be taken onto the same deck. Furthermore, efforts have been made to shape protecting means for the place of angular deflection, but such means caused much friction due to the high forces encountered, later resulting in fractures.

BRIEF SUMMARY OF THE INVENTION

It is, thus, an object of the present invention to provide an angular member for the transition point in seismic cables between the inner portion and the main cable portion extending in the towing direction, at which angular member buoyancy means, e.g. paravanes, and otter board means, are also attached, and which angular member should also be able to absorb the loads occurring at this point without any damage to the cable. A further object of the present invention is to provide an angular member which to a certain degree absorbs the yanks and impacts that will, necessarily, occur in the inner portion of the cable during towing in the water.

A further object of the invention is to provide such an angular member designed to make all handling of the cable as simple as possible, including hauling in and paying out, and also to carry out maintenance work.

The above objects are achieved by an angular member of the above mentioned.

according to the invention wherein a member is provided that will automatically adjust to the prevailing angle, so that the cable can slip around the member without friction and disturbances of the cable to any significant degree. The cable is also attached and held in the angular member in such a manner that yanks in the lead in portion are not directly transmitted to the active portion of the cable behind the member. The member according to the invention will, thus, follow natural movement in the water, have a simple structure, and can be hauled in and payed out without any significant problems.

BRIEF DESCRIPTION OF THE DRAWINGS

The invention will now described in more detail with reference to an embodiment shown in the accompanying drawing, wherein:

FIG. 1 is a diagrammatic top plan view of a vessel towing two seismic cables that are laterally displaced and provided with the angular member according to the invention;

FIG. 3 is a front elevational view of the fixing block for a cable.

DETAILED DESCRIPTION

Figure 2:
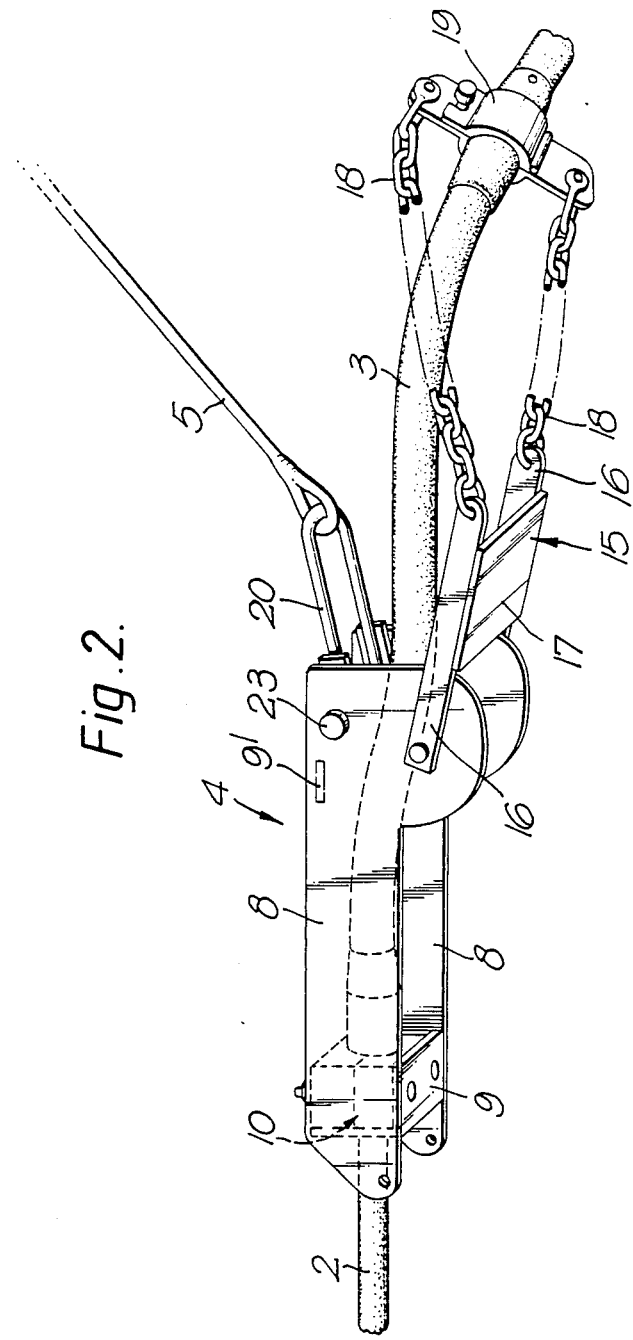
FIG. 2 is a perspective view of the angular member according to the invention.

The field of application for the invention is shown in principle and rather diagrammatically in FIG. 1. A vessel 1 tows two cables, e.g. streamers that are placed at a mutual distance and laterally displaced and in parallel in relation to vessel 1 and the course of travel thereof. Each seismic cable comprises an inner portion 2 and an active main portion 3 that is towed in parallel with the towing direction. The point of transition between inner portion 2 and main portion 3 is provided with an angular member 4 according to the invention. Via a wire or chain, e.g. an otter board member 6 and a paravane 7 are also attached to angular member 4. When the vessel tows cable means 2,3 through the water in the direction of arrow A there will occur yanks and tugs in inner cable portion 2 due to movement in the water, etc. Such yanks etc. will be transmitted to member 4, and further, to main cable 3. In the case of a streamer with hydrophones such yanks etc. will influence the measurements very detrimentally and should be avoided. It also clearly appears that there will be heavy loads in the area of member 4, where stretch loads occur in three directions with constant movement in the angular area. The inner cable portion 2 must also be made strong enough to sustain the towing load.

In order to solve the problems in connection with the angular area, an angular member is provided according to the invention and is shown in the shape of a preferred embodiment in FIG. 2. The angular member comprises a steel frame consisting of two plates 8 that are secured at a mutual distance apart. To stabilize the frame structure, spacer means, e.g. means indicated by 9 and 9', are secured by welding between plates 8. In the front portion of the frame member a securing block 10 is provided which is indicated by broken lines in FIG. 2, and which is placed on one plate member 9. An example of the design of such a securing block is diagrammatically shown in FIG. 3. Block 10 comprises two members 11 and 12 having grooves 21, 22 respectively adapted to the conventional cable dimensions of inner portion 2.

The cable that is to be extended through the angular member is introduced between frame plates 8 and placed in the groove, or opening, 21 in block 11. Block 12 is then arranged in place with groove 22 over the cable and secured by the aid of bolts 13 extending through aligned bores in blocks 11, 12 and nuts on the ends of the bolts. If desired, the cable may also be fixed by the aid of a screw 14 in the manner of a setscrew threadedly engaging in a threaded bore in block 12 and engageable with the cable at the inner end.

At the other end of the frame a ramp 15 is secured, which is intended to form a basis for the cable portion 3 that is extended from the front portion 2. Ramp 15 is rotatable in the plane of the ramp plates and may have two arms 16 that are pivotably connected at their front ends with a lug on each frame plate 8. A bottom plate 17 is provided between arms 16 and is welded to them. At the other end of the lateral members 16 of the ramp remote from the frame 8 two chains 18 are attached and provided with a clamping means 19 intended for being firmly clamped about cable 3. This arrangement of chains 18 and clamp 19 is provided to hold cable portion 3 firmly at a distance from the first place of attachment 10, and the cable is loosely placed between these two places of attachment.

In the same area of the frame where ramp 15 is secured there is also a hoop 20 which is pivotable in the plane of the frame plate and is used for securing the cable 5 extending to otter board 6 and paravane 7. Hoop 20 may have the shape of a steel hoop that is attached by the aid of a through shaft 23 to frame plates 8, but may also have a different structure if that is deemed suitable.

The cable to be extended through angular member 4 is, thus, with its inner portion 2 inserted in securing member 10, is fastened there, and extends in an untensioned state to the next securing member 19 where the cable, now its active main portion, is fastened again. In the event of movement in the member 4 it will absorb swiveling movements both due to pivotable means 20, and pivotable ramp 15. Yanks and tugs will, thus, cause loosening and tensioning of chains 18 and will, consequently, dampen yanks and tugs that might be transmitted to main cable portion 3, and because of loose fastening of the cable stretching and bending forces will not be exerted on the cable in the critical bending area so that this area is protected.

The embodiment described above only illustrates one possible structure of such an angular member, and many modifications are, obviously, possible within the scope of the invention. The two fastening means may, e.g. be shaped in a different manner, and shock absorbing means might also be incorporated, e.g. in the area of chains 18. It might also be suitable to hold cable 3, at least loosely, to ramp 15 so that the cable follows the movements of the ramp. This may be achieved by taping the cable to bottom plate 17 of the ramp.

I claim:

1. An angular member for a seismic cable towed through water by a vessel and having a device attached to the cable for positioning the cable laterally spaced from and substantially parallel to the path of travel of the vessel, comprising:
   two frame plates secured together in mutually spaced relationship to form a frame member having front and rear ends and a longitudinal axis;
   a first cable fastening means secured to the front end portion of said frame member for fastening to the cable at a desired position thereon;
   a ramp member pivotably mounted on the rear end portion of said frame member for pivotable movement about an axis extending transversely to said longitudinal axis of said frame member;
   chain means connected to said ramp member;
   a second cable fastening means connected to said chain means at a position thereon spaced from said frame member for fastening to the cable rearwardly of said first fastening means;
   said cable being slack between said first and second fastening means; and
   a line guiding fastening means pivotably connected to said rear portion of said frame member for pivotable movement in substantially the same pivoting direction as said ramp and for connecting to a guiding line having a means thereon for guiding said cable laterally relative to the path of travel of the vessel;
   so that when said cable is towed, said frame member, ramp, and chain means absorb towing strain and facilitate bending of said cable between said first and second fastening means and said slack relieves said towing strain in the cable between said first and second fastening means.

2. The angular member as claimed in claim 1 wherein:
   said guiding line fastening means has a pivot axis substantially parallel to the pivot axis of said ramp.

3. The angular member as claimed in claim 1 wherein said first fastening means comprises:
   two block members;
   cooperating grooves in said blocks for gripping the cable when said block members are assembled; and
   screw means for clamping said block members together with the cable in said grooves.

4. The angular member as claimed in claim 3 wherein:
   said guiding line fastening means has a pivot axis substantially parallel to the pivot axis of said ramp.

5. The angular member as claimed in claim 2 wherein:
   the cable passes through said frame member between said frame plates and between said pivot axes.

6. The angular member as claimed in claim 4 wherein:
   the cable passes through said frame member between said frame plates and between said pivot axes.

7. The angular member as claimed in claim 1 wherein said ramp comprises:
   two elongated mutually spaced arms having front and rear ends;
   means to pivotably connect said arms to said frame plates at the front end portion of each arm;
   a planar portion extending between and connected to said arms rearwardly from said frame member; and
   means to connect said chain means to said rear ends of said arms.

8. The angular member as claimed in claim 6 wherein said ramp comprises:
   two elongated mutually spaced arms having front and rear ends;
   means to pivotably connect said arms to said frame plates at the front end portion of each arm;
   a planar portion extending between and connected to said arms rearwardly from said frame member; and
   means to connect said chain means to said rear ends of said arms.

9. The angular member as claimed in claim 1 wherein said chain means comprises:
   a pair of chains.

10. The angular member as claimed in claim 8 wherein said chain means comprises:
    a pair of chains.

* * * * *